Sept. 6, 1960        W. BOTT        2,951,672
PIPE HOLDER FOR END OF PIPE
Filed Aug. 27, 1957
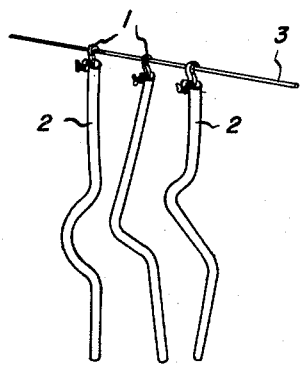
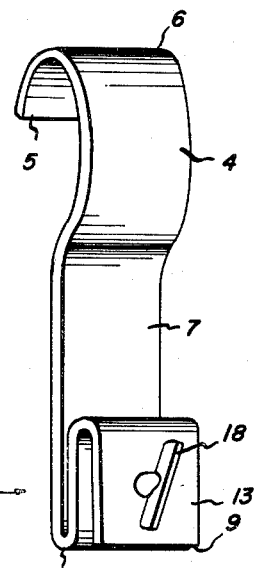
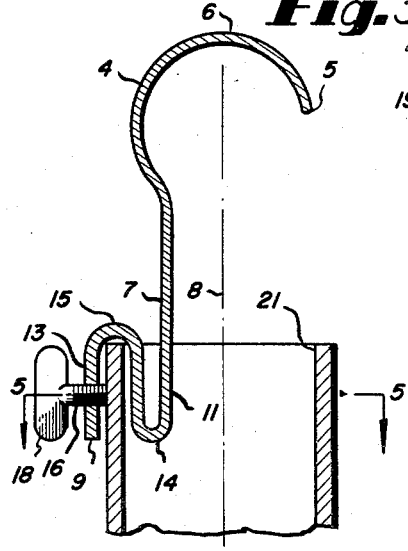
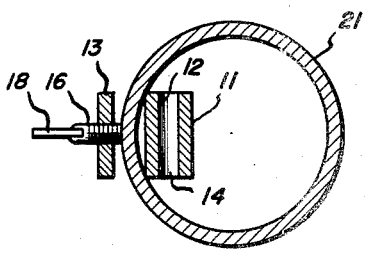
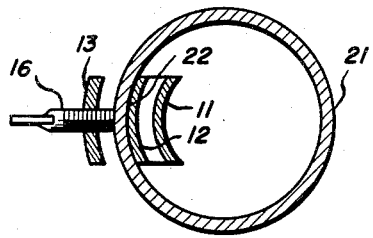
INVENTOR
WILLIAM BOTT
BY
ATTORNEYS United States Patent Office 2,951,672
Patented Sept. 6, 1960

2,951,672
PIPE HOLDER FOR END OF PIPE
William Bott, 33 S. Delaware Ave., Minersville, Pa.
Filed Aug. 27, 1957, Ser. No. 680,544
2 Claims. (Cl. 248—317)

The present invention relates to a pipe holder for supporting pipes, more particularly to a pipe holder which is detachably mounted at the end of an irregularly shaped automobile muffler pipe to enable the muffler pipe to be hung by said holder from an overhead supporting rod in a substantially vertical position.

The conventional automobile muffler pipe is approximately six feet long and has an irregular shape throughout its length. Since the muffler pipes for various makes of automobiles are all different, it is impossible to make a single rack which will compactly hold the different shaped muffler pipes. For the small garage to stock a sufficient number of muffler pipes for automobiles of various makes, a substantial amount of valuable space is required. Even then, the use of racks does not always permit all of the pipes to be readily accessible.

Prior attempts to provide pipe holders which would be secured to the end of the muffler pipes so that the pipes could be hung in a vertical position were not too successful since in most cases the pipe holders either deformed the end of the pipe in gripping the pipe or required a hole in the end of the pipe for proper gripping action. In addition, these holders were often complicated and required considerable effort in order to attach and/or detach the pipe holder to the end of the pipe. Also, the conventional pipe holder, so fastened to the end of the pipe, was not always rigid with the pipe, so that it was very difficult to hang a pipe so equipped from an overhead supporting rod where the attendant could not reach the rod to mount the holder therein.

It was therefore necessary, in order to facilitate the storing of automobile muffler pipes, to provide a pipe holder with extremely simple construction which could be readily attached and detached from the open end of the muffler pipe to enable the pipe to be quickly hooked over an overhead supporting rod.

It is therefore the principal object of this invention to provide a pipe holder which can be detachably mounted on the open end of an automobile muffler pipe to enable the pipe to be easily secured to an overhead supporting rod.

It is another object of this invention to provide a pipe holder of extremely simple construction and which can be readily attached to and removed from a pipe to form a rigid extension of the pipe.

It is a further object of this invention to provide a pipe holder which can grip a pipe without deforming the pipe or requiring any holes or other deformation of the pipe to obtain a strong gripping action.

It is an additional object of this invention to provide a pipe holder for attachment to the open end of the muffler pipe which when hooked over an overhead supporting rod will enable the muffler pipe to hang in a substantially vertical position.

It is still another object of this invention to provide a novel and effective method for storing irregularly shaped automobile muffler pipes which requires a minimum of space and a minimum of effort on the part of personnel.

The pipe holder of this invention essentially comprises a flat strip of metal bent to form a hook at one end which is to be placed on an overhead supporting rod and a reverse bend formed in the other end which is to be used to grip the pipe. The wall at the end of the pipe is inserted between two portions of the reverse bend and an adjusting screw in the reverse bend is screwed against the pipe wall so as to tightly grip the pipe in the reverse bend. As a result, the pipe holder will be securely attached to the wall of the pipe to form a unit with the pipe to facilitate the storing and hanging of the pipe on an overhead supporting rod. However, the pipe holder may be readily removed merely by unscrewing the adjusting screw.

Other objects and advantages of this invention will become readily apparent upon reference to the accompanying description when taken in conjunction with the following drawings wherein:

Fig. 1 is an over-all perspective view showing the manner in which automobile muffler pipes equipped with the pipe holder of this invention are stored;

Fig. 2 is an over-all perspective view of the pipe holder of this invention;

Fig. 3 is a side elevational view of the pipe holder of this invention as attached to the end of the pipe, with portions of the pipe holder and pipe being shown in section to illustrate the manner in which the pipe holder is attached to the pipe;

Fig. 4 is a rear elevation view of the pipe holder of this invention taken slightly at an angle so as to show the flat strip from which the pipe holder is fabricated;

Fig. 5 is a sectional view taken along the lines 5—5 of Fig. 3 showing the manner in which the pipe wall is gripped by the pipe holder; and Fig. 6 is a sectional view similar to Fig. 5 but showing a modification of the gripping portion of the pipe holder.

Proceeding now to the drawings, more particularly to Fig. 1, wherein like reference symbols indicate the same parts throughout the various views, 1 indicates the pipe holder of this invention attached to the end of an automobile muffler pipe 2 and hooked over a horizontal overhead supporting rod 3.

The pipe holder 1 is shown in greater detail in Figs. 2 through 4 and is formed from a ⅛ x ¾ strip of cold steel indicated at 4, having one end 5 which is bent to form a hook 6 for supporting the holder. The hook has a radius of curvature of about ¾ inch. The strip 4 is then bent smoothly inwardly at 7 toward the center line of the hook as indicated at 8 to a point approximately one-half of the radius of the hook.

The other end of the steel strip is indicated at 9 and is bent in the form of a reverse bend indicated generally at 10, comprising a first or inner bend 11, an intermediate bend 12, and an outer bend 13. Since the reverse bend is formed from a single piece of material, the bend portions 11 through 13 are interconnected at 14 and 15 to then form an integral reverse bend. As may be clearly seen in Fig. 3, the bend portions 11 through 13 are substantially parallel to each other.

There is a threaded hole 16 in the outer bend 3, and an adjusting screw 17 is received within the hole 16. The screw may either have a wing head 18 as shown in Fig. 3, or may merely be a store bolt 19 as shown in Fig. 2, the end of which is bent at substantially a right angle to form a handle 20. The pipe holder as described has a total length of about 4 inches, which may be varied.

To secure the pipe holder onto the end of an automobile muffler pipe, the pipe wall at an open end of the pipe as illustrated at 21 in Fig. 3 is inserted between the outer and intermediate ends of the reverse bend. The adjusting screw 17 is then threaded against the outer surface of the pipe so as to force the pipe wall against the inner bent portion, as may be seen in Fig. 5. As a result, the pipe wall will be tightly gripped between the adjusting screw and the inner bend 12. The pipe holder is now rigidly connected to the end of the muffler pipe.

The pipe holder is then gripped at its lower end by the operator and raised a sufficient height to enable the hook 6 of the pipe holder to become hooked over the horizontal rod 3. Once the pipe holder has been attached to the end of the muffler pipe, it is unnecessary that any further adjustment be made to the pipe holder to hook the holder over the supporting rod. The pipe holder is rigidly attached to the muffler pipe so that together with the pipe it forms a single unit, which greatly facilitates the handling of the muffler pipes.

The curved bend 7 is so positioned that the muffler hangs below the horizontal pipe and is in substantially a vertical position. Consequently, the overhead supporting rod may be closely spaced to a vertical wall, and since the muffler pipes hang vertically, they will not contact the wall and be marred or damaged.

When it is desired to use a particular muffler pipe, the pipe is merely unhooked from the overhead supporting rod and the pipe holder is detached from the muffler pipe by loosening the adjusting screw 17. The loose pipe holder may then be thrown into a compartment or box provided near the muffler pipe storage area for use when it is desired to store an additional pipe.

Except for a possible slight indentation made by the end of the adjusting screw, the muffler pipe will be undamaged.

In a further modification as shown in Fig. 6, the intermediate bend 12 of the reverse bend may be curved slightly so as to conform to the curvature of the inner surface of the muffler pipe, as indicated at 22. This curvature is not necessary for proper operation of the pipe holder since the pipe holder will operate effectively without it.

Thus it can be seen that the present invention provides a rigid pipe holder for automobile muffler pipes which is made from a single flat strip of metal. The pipe holder is simple in construction and may be readily made at an economical price so that considerable numbers of muffler pipes may be economically stored by the use of this pipe holder. The pipe holder may be made extremely small but yet be effective.

It will be understood that this invention is susceptible to modification in order to adapt it to different usages and conditions, and, accordingly, it is desired to comprehend such modifications within this invention as may fall within the scope of the appended claims.

What is claimed is:

1. A pipe holder for attachment to the end of a pipe and comprising a single strip of flat material with one end of said strip being curved to form a hook, there being a straight central portion of said strip extending from one end of said hook at a point substantially halfway of the radius of said hook, the other end of said strip having a first reverse bend bent toward said hook but on the opposite side of said central portion from said curved hook, and a second reverse bend extending from the end of said first bend and bent away from said hook, all of said bends and the straight central portion of said holder being substantially parallel and spaced from each other, there being a threaded hole in said second bend, and an adjusting screw in said threaded hole to be screwed against the outer surface of a pipe wall inserted between said first and second bends to detachably secure said pipe holder onto the end of the pipe.

2. A pipe holder for attachment to the end of a pipe and comprising a single strip of flat material with one end of said strip being curved to form a hook, there being a straight central portion of said strip extending from one end of said hook at a point substantially halfway of the radius of said hook, the other end of said strip having a first reverse bend bent toward said hook but on the opposite side of said central portion from said curved hook and a second reverse bend extending from the end of said first bend and bent away from said hook, all of said bends and the straight central portion of said holder being substantially parallel and spaced from each other, said first bend being curved transversely thereof to conform to the curvature of the pipe to which the pipe holder is to be secured, there being a threaded hole in said second bend, and an adjusting screw in said threaded hole to be screwed against the outer surface of a pipe wall inserted between said first and second bends to detachably secure said pipe holder onto the end of the pipe.

References Cited in the file of this patent

UNITED STATES PATENTS

| | | |
|---|---|---|
| 322,462 | Maddox | July 21, 1885 |
| 573,317 | Younger | Dec. 15, 1896 |
| 1,221,059 | Jones | Apr. 3, 1917 |
| 1,897,248 | Ferguson | Feb. 14, 1933 |
| 2,601,407 | Marshall | June 24, 1952 |
| 2,699,263 | Ore | Jan. 11, 1955 |

FOREIGN PATENTS

| | | |
|---|---|---|
| 807,524 | Germany | July 2, 1951 |